United States Patent
Yoshida (10) Patent No.: US 12,515,287 B2
(45) Date of Patent: Jan. 6, 2026

(54) TOOL MAGAZINE APPARATUS

(71) Applicant: OKUMA CORPORATION, Niwa-gun (JP)

(72) Inventor: Makoto Yoshida, Niwa-gun (JP)

(73) Assignee: OKUMA CORPORATION, Niwa-gun (JP)

( * ) Notice: Subject to any disclaimer, the term of this patent is extended or adjusted under 35 U.S.C. 154(b) by 484 days.

(21) Appl. No.: 18/187,323

(22) Filed: Mar. 21, 2023

(65) Prior Publication Data

US 2023/0347461 A1    Nov. 2, 2023

(30) Foreign Application Priority Data

Mar. 29, 2022 (JP) ................. 2022-052875

(51) Int. Cl.
    *B23Q 3/155*    (2006.01)
    *B23Q 3/157*    (2006.01)

(52) U.S. Cl.
    CPC ..... *B23Q 3/15513* (2013.01); *B23Q 3/15539* (2016.11); *B23Q 3/15773* (2013.01); *B23Q 2003/15532* (2016.11); *B23Q 2003/155421* (2016.11)

(58) Field of Classification Search
    CPC ............ B23Q 3/15539; B23Q 3/15773; B23Q 3/15536; B23Q 2003/15531; Y10T 483/175; Y10T 483/1845; Y10T 483/1855; Y10T 483/1757; Y10T 483/176; Y10T 483/1776; Y10T 483/18; Y10T 483/1836
    See application file for complete search history.

(56) References Cited

U.S. PATENT DOCUMENTS

2016/0311075 A1 * 10/2016 Yamamoto ......... B23Q 3/15773

FOREIGN PATENT DOCUMENTS

| EP | 2295199 A1 | 3/2011 |
|----|------------|--------|
| JP | S51-69179 U | 6/1976 |
| JP | 2003-340670 A | 12/2003 |
| JP | 5658850 B1 | 1/2015 |

OTHER PUBLICATIONS

Notice of Reasons for Refusal mailed May 20, 2025, issued in the corresponding JP patent application No. 2022-52875 and machine translation thereof.

* cited by examiner

*Primary Examiner* — Christopher J. Besler
(74) *Attorney, Agent, or Firm* — Troutman Pepper Locke LLP (57) ABSTRACT

Provided is a tool magazine apparatus capable of preventing a phase error in attaching a tool to a tool holding gripper. A tool magazine apparatus includes: a magazine body having both front and rear racks each provided with tool holding grippers; a tool transfer device to take out a tool from the both racks and attach a tool to the both racks; a tool standby pot to hold a tool; and an intra-magazine tool change device to deliver a tool between the tool standby pot and the tool transfer device. The tool transfer device includes: a moving body disposed between the both racks; a base disposed on the moving body and being rotatable around an axis extending in the Z-axis direction; a transfer gripper attached to the base and being movable in a plane orthogonal to the Z-axis direction; and an air cylinder causing the transfer gripper to move.

4 Claims, 6 Drawing Sheets

TOOL MAGAZINE APPARATUS

DETAILED DESCRIPTION OF THE PRESENT INVENTION

Technical Field

The present invention relates to a tool magazine apparatus that is provided in a machine tool such as a machining center, for example.

Figure 1:
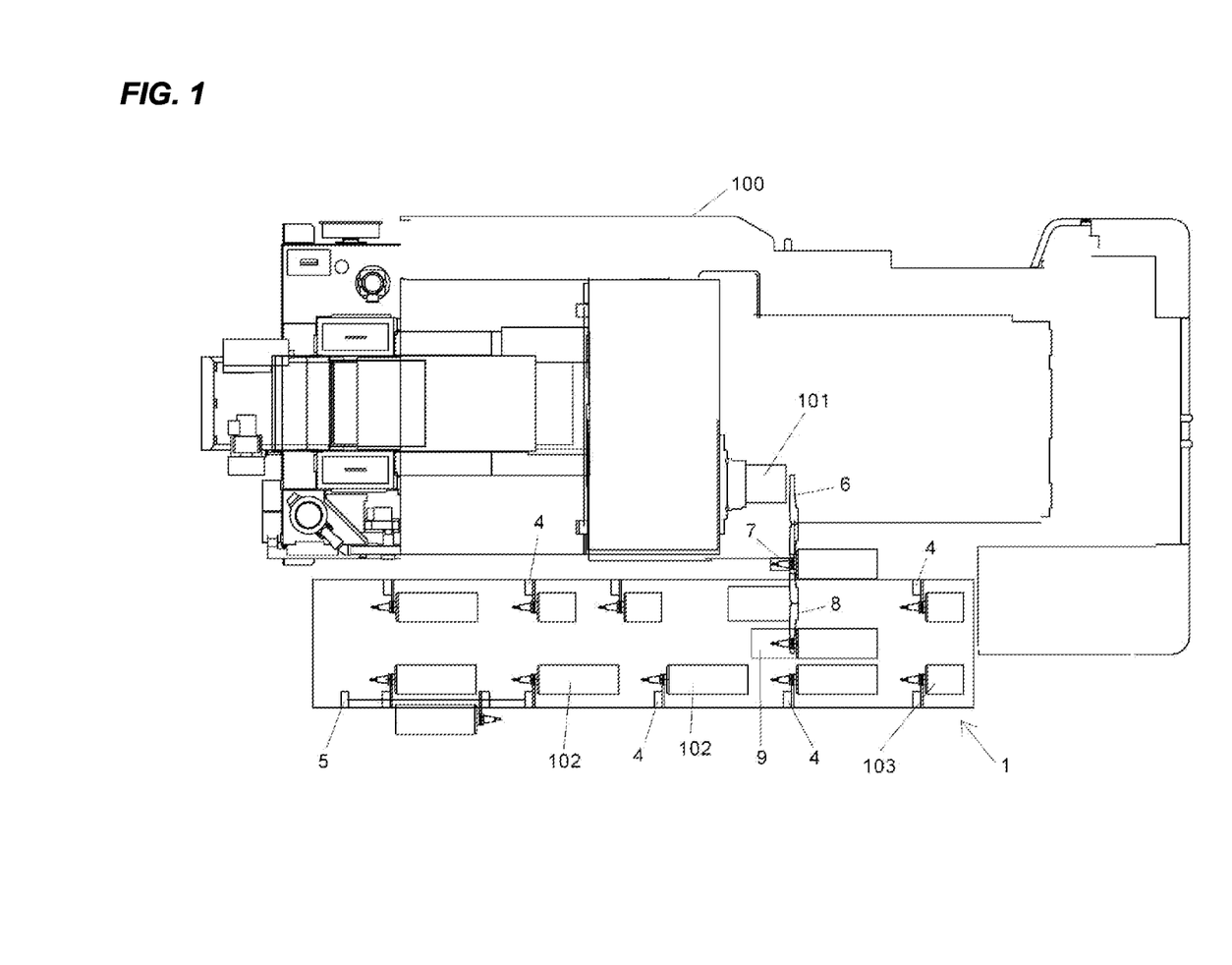
FIG. 1 is a plan view showing a schematic configuration of a horizontal machining center including a tool magazine apparatus in accordance with the present invention, with some components omitted.

In this DESCRIPTION and CLAIMS, the lower side of FIG. 1 (left side of FIGS. 3 and 4) will be referred to as a "front" side and the opposite side thereof will be referred to as a "rear" side.

BACKGROUND ART

For example, in order to realize an unmanned operation of a machining center for a long period of time, there is a need to use a tool magazine apparatus having a large number of tool holding parts and capable of storing a wide variety of tools. However, there has been problems that the size of such a tool magazine apparatus is increased and that the installation area of an overall machine tool is increased. In addition, each of the tool holding parts of the tool magazine apparatus needs to have a size capable of storing a tool having a maximum length and a maximum diameter, and in such a case, depending on types of machining to be performed on a workpiece, at least some of all the tool holding parts do not store tools in some cases, and at least some of all the tool holding parts do not store a tool having the maximum length and/or the maximum diameter in other cases, which causes an increase in useless space, resulting in deterioration in tool storage efficiency.

Under these circumstances, as a tool magazine apparatus that solves such problems, a tool magazine apparatus as follows is known: a tool magazine apparatus including: a magazine body consisting of a frame, and a plurality of front racks and rear racks that are detachably attached to the frame with a longitudinal direction of the both front and rear racks directed in an identical direction and are configured to hold a plurality of tools such that a direction of a tool axis of each tool is directed in a Z-axis direction which is a spindle axis direction; and a tool transfer device that is disposed on the magazine body so as to move in the Z-axis direction and in the longitudinal direction of the both front and rear racks and is configured to take out the tool from the both front and rear racks and attach the tool to the both front and rear racks, each of the front racks being provided at intervals in the longitudinal direction thereof with a plurality of tool holding grippers that are open rearward and are configured to hold the tools, each of the rear racks being provided at intervals in the longitudinal direction thereof with a plurality of tool holding grippers that are open frontward and are configured to hold the tools, the both front and rear racks being respectively arranged at intervals in the Z-axis direction, the tool transfer device including: a shifter configured to move in the direction of the tool axis of the tools held at the tool holding grippers and in the longitudinal direction of the both front and rear racks; and a magazine arm having one end that is attached to the shifter so as to be rotatable around an axis extending in the Z-axis direction and the other end at which a tool transfer gripper is disposed, and each of the tool holding grippers of the both front and rear racks being provided with a tool phase determining key that fits into a tool phase determining keyway formed on a shank of a tool holder for the tools (see Patent Literature 1).

According to the tool magazine apparatus described in Patent Literature 1, it is possible to efficiently store a wide variety of tools by predetermining the arrangement of the racks in the direction of the tool axis of the tools to be held at the tool holding grippers, depending on the tool lengths and the tool diameters.

CITATION LIST

Patent Literature

Patent Literature 1: Japanese Patent No. 5658850

SUMMARY OF THE INVENTION

Problem to be Solved by the Invention

In general, as for tools that conform to the DIN standards, the CAT standards, and the HSK standards, for example, two tool phase determining keyways are formed on a shank of a tool holder and are circumferentially spaced apart from each other by 180 degrees, and both of the tool phase determining keyways have different depths and widths to each other, with the depth and the width of one of the tool phase determining keyways being greater than the depth and the width of the other tool phase determining keyway.

In the tool magazine apparatus described in Patent Literature 1, because the attachment/detachment of tools to/from the tool holding grippers of the both front and rear racks is performed only by swiveling the magazine arm, the phase around the tool axis of the tools relative to the tool holding grippers of the front racks is different from the phase around the tool axis of the tools relative to the tool holding grippers of the rear racks. As a result, the tool phase determining key that is disposed on the tool holding gripper of the front rack and is to be fitted into the tool phase determining keyway needs to have dimensions different from those of the tool phase determining key that is disposed on the tool holding gripper of the rear rack and is to be fitted into the tool phase determining keyway.

In this case, the tool phase determining key having smaller dimensions fits into both of the tool phase determining keyways of the tool holding grippers. Therefore, when attachment of the tools to the both racks of the tool magazine apparatus is performed manually by an operator, there exists a risk of an error in the phase around the tool axis of the tool relative to the tool holding gripper.

In view of these circumstances described above, an object of the present invention is to provide a tool magazine apparatus capable of preventing an phase error in attaching a tool to the tool holding gripper of the both front and rear racks of the magazine body.

Means for Solving the Problem

In order to achieve the above-described object, the present invention consists of the following aspects.

1) A tool magazine apparatus including: a magazine body consisting of a frame, and a plurality of front racks and rear racks that are detachably attached to the frame with a longitudinal direction of the both front and rear racks directed in an identical direction and are configured to hold a plurality of tools such that a direction of a tool axis of each tool is directed in a Z-axis direction which is a spindle axis direction; and a tool transfer device that is disposed on the magazine body so as to move in the Z-axis direction and in the longitudinal direction of the both front and rear racks and is configured to take out the tool from the both front and rear racks and attach the tool to the both front and rear racks, each of the front racks being provided at intervals in the longitudinal direction thereof with a plurality of tool holding grippers that are open rearward and are configured to hold the tools, each of the rear racks being provided at intervals in the longitudinal direction thereof with a plurality of tool holding grippers that are open frontward and are configured to hold the tools, and the both front and rear racks being respectively arranged at intervals in the Z-axis direction, wherein the tool magazine apparatus comprises: a tool standby pot configured to hold the tool to be attached to a spindle of a machine tool and the tool to be removed from the spindle, with the direction of the tool axis directed in the Z-axis direction; and an intra-magazine tool change device that is disposed on the magazine body so as to move in the Z-axis direction relative to the tool standby pot and is configured to deliver the tool between the tool standby pot and the tool transfer device, and the tool transfer device comprises: a moving body that is disposed between the front racks and the rear racks and is configured to move in the Z-axis direction and in the longitudinal direction of the both front and rear racks; a base that is disposed on the moving body so as to be rotatable around an axis extending in the Z-axis direction; a transfer gripper that is attached to the base so as to be movable in a plane orthogonal to the Z-axis direction and is configured to hold the tool with the direction of the tool axis directed in the Z-axis direction; and an actuator that is attached to the base and is configured to cause the transfer gripper to move in the plane so as to cause the transfer gripper to move to a tool attachment/detachment position to/from one of the tool holding grippers.

2) The tool magazine apparatus according to the above-described aspect 1), wherein, at a deepest part of each of the tool holding grippers of the both front and rear racks, provided is a key configured to fit only into a tool phase determining keyway having a greater depth and a greater width, out of two tool phase determining keyways that are formed at a tool holder and have different depths and widths.

3) The tool magazine apparatus according to the above-described aspect 1) or 2), wherein the intra-magazine tool change device comprises a swivel arm that is provided at both end portions in a longitudinal direction thereof with tool grasping parts and is rotatable around an axis passing through a center part in the longitudinal direction and extending in the z-axis direction, the both tool grasping parts of the swivel arm have point symmetry having a rotation center thereof as a symmetry center thereof when viewed in the Z-axis direction, and the intra-magazine tool change device is configured to deliver the tool between the tool standby pot and the transfer gripper such that a state in which the tool is held at the tool standby pot and a state in which the tool is held at the transfer gripper of the tool transfer device are in opposite phases around the tool axis to each other.

4) The tool magazine apparatus according to any one of the above-described aspects 1) to 3), wherein, among all of the both front and rear racks, there exist a plurality of types of racks configured to hold tools having different lengths and diameters.

Advantageous Effects of the Invention

With the tool magazine apparatus of the above-described aspects 1) to 4), in a case where, when a tool, in which two tool phase determining keyways are formed on a shank of a tool holder and are circumferentially spaced apart from each other by 180 degrees and the both tool phase determining keyways have different depths and widths to each other, for example, a tool conforming to the DIN standards, the CAT standards, or the HSK standards, is to be attached to one of the tool holding grippers of the front racks and the rear racks of the magazine body, a tool phase determining key that fits only to a tool phase determining keyway having a greater depth and a greater width, out of the two tool phase determining keyways having different dimensions, is provided on each of the tool holding grippers of the front racks and the rear racks of the magazine body, the tool phase determining key does not fit into a tool phase determining keyway having a smaller depth and a smaller width when the tool is manually attached to the tool holding gripper of the both front and rear racks by an operator, which constantly allows the phase around the tool axis of the tool relative to the tool holding gripper to be in a normal state, and therefore enables prevention of a phase error in attaching the tool to the tool holding gripper of the both front and rear racks.

In addition, when a tool is attached/detached to/from the both front and rear racks of the magazine body, the actuator is configured to cause the transfer gripper to be moved to the tool attachment/detachment position and hold/release the tool in a state where the base of the tool transfer device swivels around its center axis of rotation and is directed to one tool holding gripper of either front or rear racks. If the tool phase determining keyway having the smaller depth and width is held at the tool holding gripper in a non-normal state with the tool phase determining keyway having the smaller depth and width facing the tool phase determining key side of the tool holding gripper, the transfer gripper is unable to move to a normal tool attachment/detachment position, and as a result, it is possible to detect that a tool is held at the tool holding gripper in a non-normal state.

Further, in a case where a tool is to be held by the rack, the base of the tool transfer device rotates whereby the actuator is capable of causing the tool held at the transfer gripper to move to the tool holding gripper side of the rack in a state where the tool phase determining keyway having the greater depth and width on the tool is directed to the tool holding gripper side of the rack. Therefore, it is constantly possible to cause the tool to be held at the tool holding gripper in a normal state.

Furthermore, because the both front and rear racks are detachable relative to the frame, it is possible to eliminate useless space and improve tool storage efficiency by changing attachment positions of the both front and rear racks so as to be in conformity with diameters and lengths of the tools to be stored.

With the tool magazine apparatus of the above-described aspect 3), the following advantageous effects are exhibited. That is, in a case where the automatic tool change device of the machine tool includes a tool change arm that is provided at both end portions in a longitudinal direction thereof with tool grasping parts and is rotatable around an axis passing through r part in the longitudinal direction and extending in the Z-axis direction, and the both tool grasping parts of the tool change arm have point symmetry having a rotation center thereof as a symmetry center thereof when viewed in the Z-axis direction, when the tool having been attached to the spindle is removed from the spindle and thereafter the tool change arm rotates, the tool is in an opposite phase around the tool axis to a phase in the state in which the tool has been attached to the spindle. Therefore, on the tool holding gripper of the rack, there is a need to provide a tool phase determining key that is fittable into the tool phase determining keyway having the smaller depth and width out of the two tool phase determining keyways having different dimensions. As a result, the tool phase determining key fittable into the tool phase determining keyway having the smaller depth and width also ends up fitting into the tool phase determining keyway having the greater depth and width, and therefore, it is impossible to obtain the above-described advantageous effect of preventing a phase error in attaching the tool to the tool holding gripper of the both front and rear racks and the above-described advantageous effect of detecting that the tool is held at the tool holding gripper in the non-normal state. However, as in the tool magazine apparatus according to the above-described aspect 3), in a case where the intra-magazine tool change device comprises a swivel arm that is provided at both end portions in a longitudinal direction thereof with tool grasping parts and is rotatable around an axis passing through a center part in the longitudinal direction and extending in the Z-axis direction, the both tool grasping parts of the swivel arm have point symmetry having a rotation center thereof as a symmetry center thereof when viewed in the Z-axis direction, and the intra-magazine tool change device is configured to deliver the tool between the tool standby pot and the transfer gripper such that a state in which the tool is held at the tool standby pot and a state in which the tool is held at the transfer gripper of the tool transfer device are in opposite phases around the tool axis to each other, it is possible to provide the tool phase determining key only fittable into the tool phase determining keyway having the greater depth and width out of the two tool phase determining keyways having different dimensions on the tool holding gripper of the rack, and as a result, it is possible to obtain the advantageous effect of preventing a phase error in attaching the tool to the tool holding gripper of the both front and rear racks and the advantageous effect of detecting that the tool is held at the tool holding gripper in the non-normal state, as described above.

DESCRIPTION OF EMBODIMENTS

Hereinafter, embodiments of the present invention will be described, with reference to the drawings attached hereto.

Figure 2:
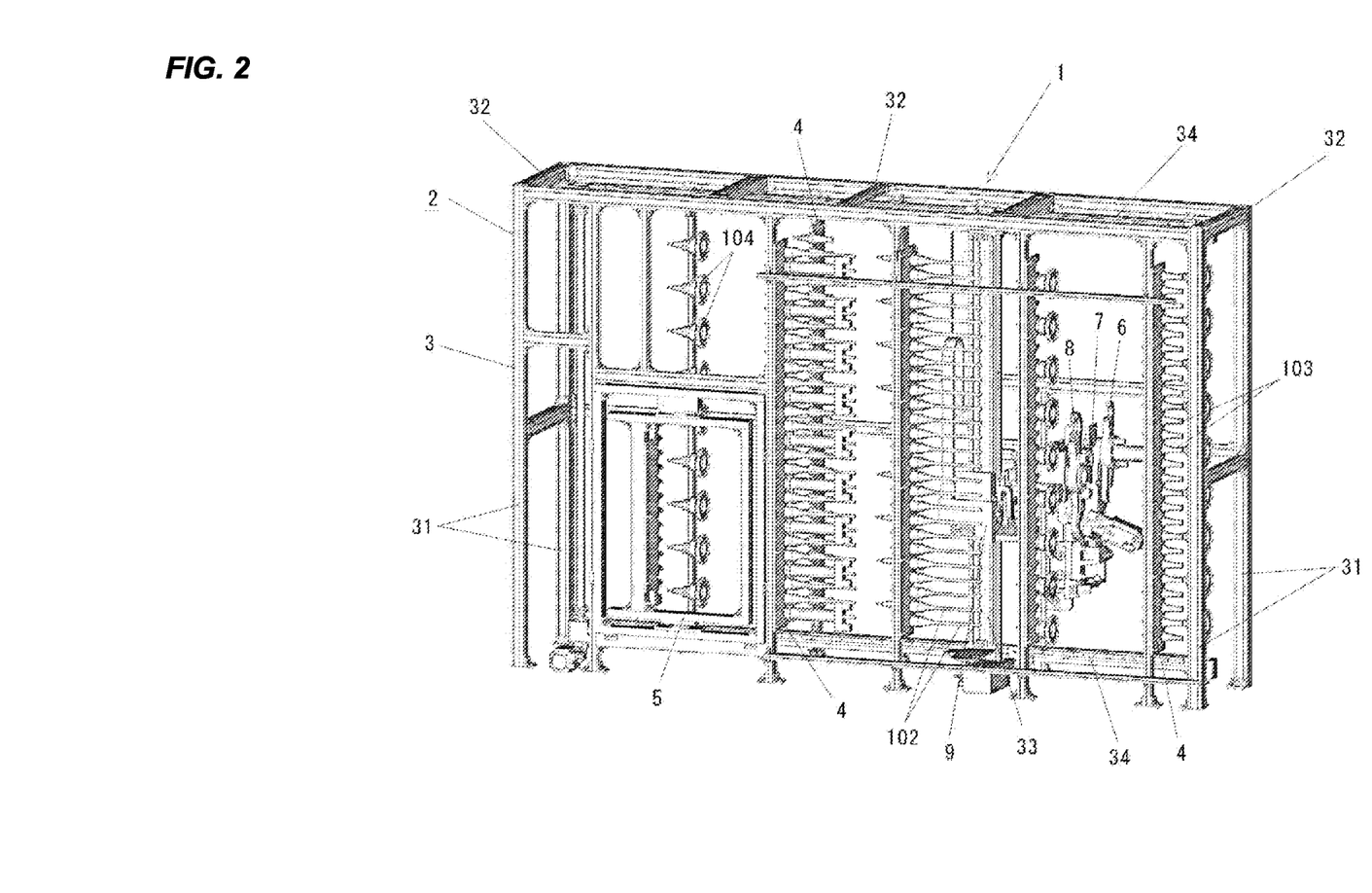
FIG. 2 is a perspective view of the tool magazine apparatus in accordance with the present invention, with some components omitted.

In the following description, the "upper-lower" side and the "right-left" side of FIG. 2 will be referred to as an "upper-lower" side and a "right-left" side, respectively.

Figure 3:
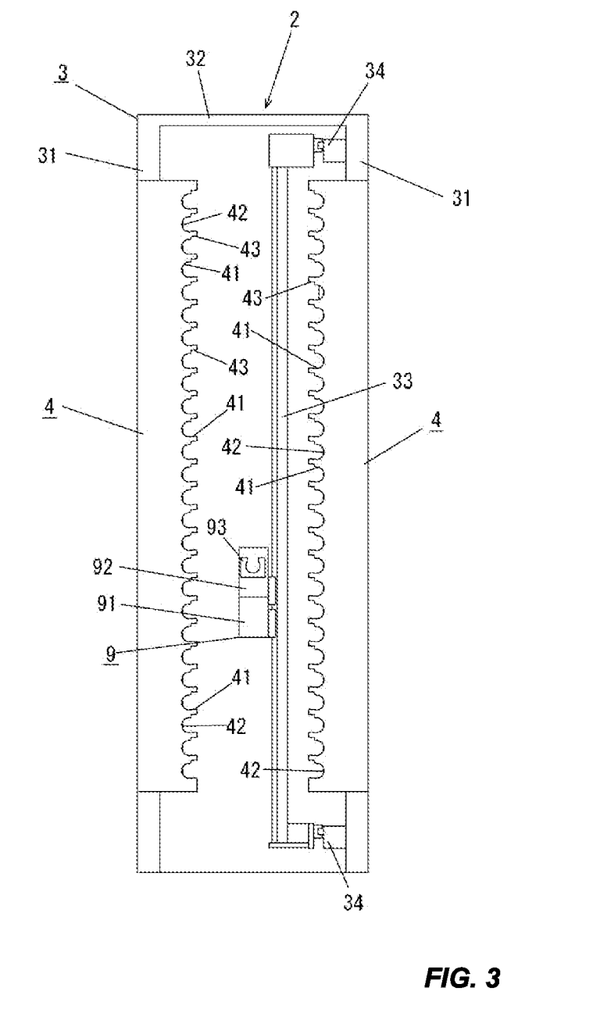
FIG. 3 is a right side view showing a magazine body and a tool transfer device of the tool magazine apparatus.
Figure 4:
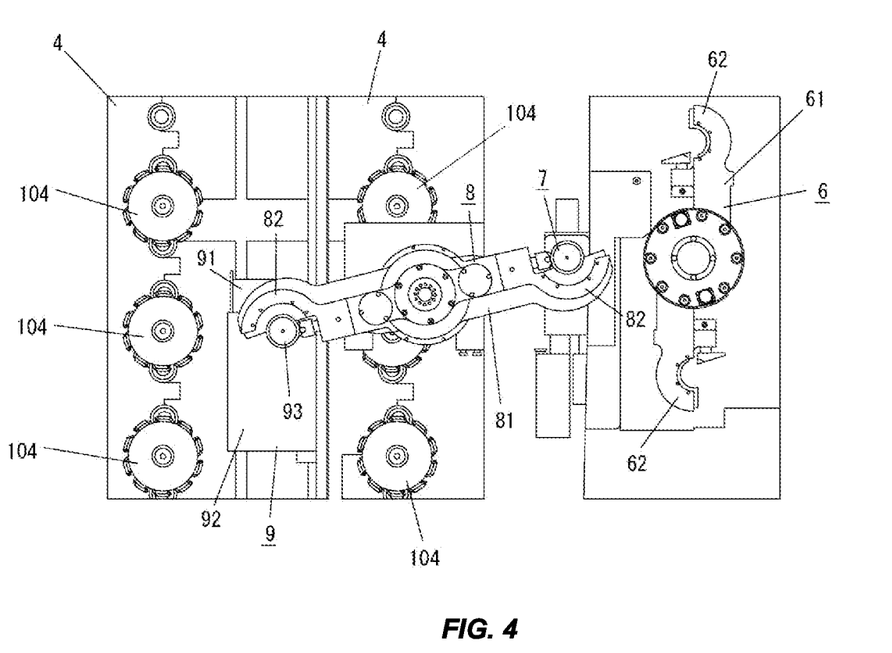
FIG. 4 is an enlarged view showing an automatic tool change device configured to change a tool attached to a spindle of the horizontal machining center, and an intra-magazine tool change device and the tool transfer device of the tool magazine apparatus, which are viewed from the right side.
Figure 5A:
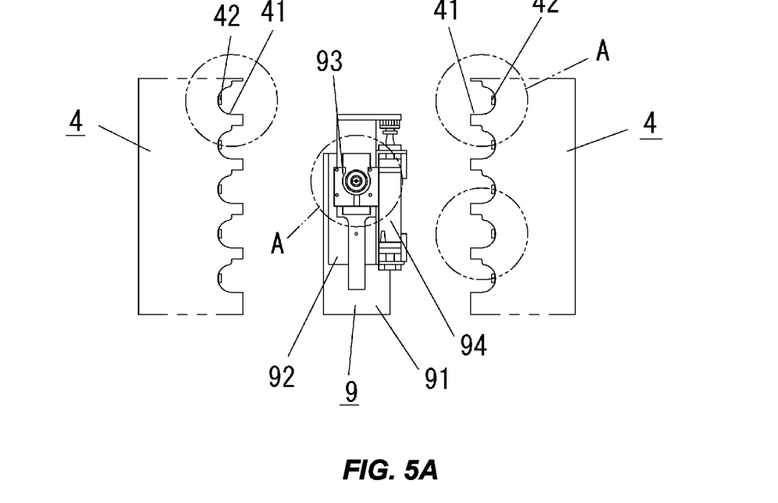
FIG. 5A, FIG. 5B and FIG. 5C show a method of attaching/detaching a tool to/from a rack of the tool magazine apparatus, which is performed by the tool transfer device, showing steps in a sequential order.
Figure 5B:
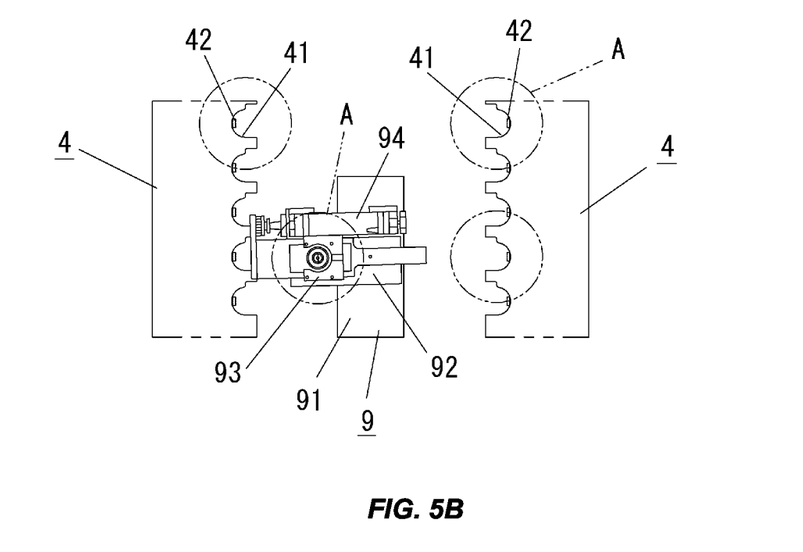
Figure 5C:
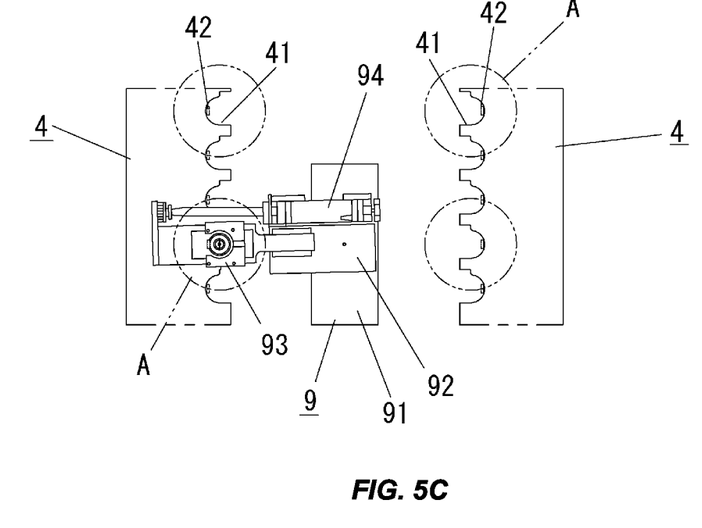

FIG. 1 shows a schematic configuration of a horizontal machining center including a tool magazine apparatus in accordance with the present invention. FIGS. 2 to 4 show the tool magazine apparatus in accordance with the present invention. FIG. 5A, FIG. 5B and FIG. 5C show a method of attaching/detaching a tool to/from a rack of the tool magazine apparatus, which is performed by the tool transfer device, showing steps in a sequential order.

In FIGS. 1 to 4, a tool magazine apparatus 1 is configured to store a wide variety of tools, such as long tools 102, short tools 103, and large-diameter tools 104, which are to be attached to a spindle 101 having an axial direction thereof in a horizontal machining center 100 being directed in the right-left direction and which are to be used for various machining, and the tool magazine apparatus 1 includes: a magazine body 2 consisting of a skeleton frame 3 formed by combining a plurality of vertical members 31 and horizontal members 32, and a plurality of both front and rear racks 4 that are detachably attached to the frame 3 with a longitudinal direction of these racks 4 directed in the up-down direction and are configured to hold a plurality of tools 102, 103, 104; a tool storage part 5 that is disposed in a front part of the frame 3 and is configured to store the wide variety of tools 102, 103, 104 that are attached to the both front and rear racks 4 of the magazine body 2 and are to be used for machining by the horizontal machining center 100; an automatic tool change device 6 configured to attach/detach the tools 102, 103, 104 to/from the spindle 101 of the horizontal machining center 100; a tool standby pot 7 configured to hold the tools 102, 103, 104 that are to be attached to the spindle 101 and the tools 102, 103, 104 that have removed been from the spindle, the attachment/removable being performed by the automatic tool change device 6; an intra-magazine tool change device 8 that is disposed on the magazine body 2 and is configured to deliver the tool between the tool standby pot 7 and the intra-magazine tool change device 8; and a tool transfer device 9 that is disposed on the magazine body 2 and is configured to deliver the tool held by the both front and rear racks 4 at an arbitrary position, between the intra-magazine tool change device 8 and the tool transfer device 9.

Hereinafter, in a case where tools do not need to be distinctively referred to as the long tools 102, the short tools 103, and the large-diameter tools 104, the tools will be collectively referred to as "a tool A" or "tools A" with a reference sign "A" added.

As shown in FIG. 3, at each of the front racks 4 of the magazine body 2, a plurality of tool holding grippers 41 are provided at intervals in the longitudinal direction of the front rack 4 so as to be open rearward and to hold tools A such that the direction of the tool axis of the tools A is directed in the right-left direction, and similarly, at each of the rear racks 4, a plurality of tool holding grippers 41 are provided at intervals in the longitudinal direction of the rear rack 4 so as to be open frontward and to hold the tools A such that the direction of the tool axis of the tools A is directed in the right-left direction. Each of the tool holding grippers 41 of the front rack 4 is open obliquely upward toward the rear, and the each of the tool holding grippers 41 of the rear rack 4 is open obliquely upward toward the front. The tool holding gripper 41 of the both front and rear racks 4 is provided at the deepest part thereof with a tool phase determining key 42 that only fits into the tool phase determining keyway having a greater depth and a greater width out of two tool phase determining keyways having different dimensions that are formed on a shank of a tool holder of the tool conforming to the DIN standards, the CAT standards, or the HSK standards, for example, and are circumferentially spaced apart from each other by 180 degrees (see FIG. 5A, FIG. 5B and FIG. 5C).

At an opening-side portion of the tool holding gripper 41 of the both front and rear racks 4, a wide part 43 is formed by cutting out an upper portion of the tool holding gripper 41. Both upper and lower edges of the wide part 43 of the tool holding gripper 41 of the both front and rear racks 4 are parallel to each other, and are each shaped as a straight line that is inclined upward toward the rear with respect to the horizontal line. An inclination angle relative to the horizontal line of the opening-side portion at the lower edge of the tool holding gripper 41 of the front rack 4 is equal to an inclination angle relative to the horizontal line of the opening-side portion at the lower edge of the tool holding gripper 41 of the rear rack 4. The tool holding grippers 41, including the tool phase determining keys 42, of the both racks 4 are shaped so as to have line symmetry having a vertical line positioned at a center between the both racks 4, as the symmetry center.

The interval of adjacent two front racks 4 are adjusted such that the long tools 102 are held at a part of all the front racks 4 and that the short tools 103 and the large-diameter tools 104 are held at the remaining part of all the front racks 4. The interval of adjacent two rear racks 4 are adjusted such that the long tools 102 are held at a part of all the rear racks 4 and that the short tools 103 and the large-diameter tools 104 are held at the remaining part of all the rear racks 4.

Delivery of tools A between the tool storage part 5 and the both front and rear racks 4 of the magazine body 2 is performed manually by an operator, for example. At this time, because the tool phase determining keys 42 do not fit into the tool phase determining keyways having the smaller depths and widths of tools conforming to the DIN standards, the CAT standards, and the HSK standards, it is possible to constantly allow the phase around the tool axis of the tools A relative to the tool holding grippers 41 to be in a normal state.

The automatic tool change device 6, as shown in FIG. 4 in detail, is provided at both end portions in a longitudinal direction thereof with tool grasping parts 62 configured to grasp the tools A, with the direction of the tool axis being directed in the Z-axis direction (right-left direction), which is the axial direction of the spindle 101, and the automatic tool change device 6 includes a tool change arm 61 that is rotatable around an axis passing through a center part in the longitudinal direction thereof and extending in the Z-axis direction. The both tool grasping parts 62 of the tool change arm 61 have point symmetry having a rotation center thereof as a symmetry center thereof when viewed in the Z-axis direction (viewed from the left or right side).

The tool standby pot 7 is configured to move in the Z-axis direction relative to the tool change arm 61 of the automatic tool change device 6, and to hold the tools A in an attitude in which the direction of the tool axis is directed in the Z-axis direction (identical direction to the direction of the tool A held at the tool grasping part 62 of the tool change arm 61). The tool A held at the tool standby pot 7 is in a phase that is inverted 180 degrees around the tool axis from the phase of the tool A having been attached to the spindle 101.

The intra-magazine tool change device 8, as shown in FIG. 4 in detail, includes a swivel arm 81 that is provided at both end portions thereof with tool grasping parts 82 configured to grasp tools A in an attitude in which the direction of the tool axis is directed in the Z-axis direction and is configured to rotate around an axis passing through a center part in a longitudinal direction of the swivel arm 81 and extending in the Z-axis direction, and the intra-magazine tool change device 8 is configured to move in the Z-axis direction relative to the tool standby pot 7.

The tool transfer device 9, as shown in FIG. 5A, FIG. 5B and FIG. 5C in detail, includes: a moving body 91 configured to move in the Z-axis direction and in the longitudinal direction (up-down direction) of the rack 4; a base 92 attached to the moving body 91 so as to be rotatable around an axis extending in the Z-axis direction; a transfer gripper 93 attached to the base 92 so as to move in a vertical plane orthogonal to the Z-axis direction and configured to hold a tool A in an attitude in which the direction of the tool axis is directed in the Z-axis direction; and an air cylinder 94, as an actuator that is attached to the base 92 and is configured to cause the transfer gripper 93 to move in the vertical plane orthogonal to the Z-axis direction. The tool A held at the transfer gripper 93 is in a phase inverted 180 degrees around the tool axis from the phase of the tool A having been held at the tool standby pot 7.

The moving body 91 is attached to a vertical guide rail 33 that is disposed on the frame 3, with the longitudinal direction of the vertical guide rail 33 being directed in the up-down direction, such that the moving body 91 is movable in the up-down direction. Both upper and lower end portions of the vertical guide rail 33 are attached to horizontal guide rails 34 disposed at both upper and lower end portions of the frame 3, with a longitudinal direction of the horizontal guide rails 34 being directed in the right-left direction, such that the moving body 91 is movable in the right-left direction. As a result, the moving body 91 is movable in the up-down direction and the right-left direction.

The positional relationship between the tool transfer device 9 and the both front and rear racks 4 of the magazine body 2 with respect to the front-rear direction is configured to have a positional relationship such that, even in a case where a large-diameter tool 104 is held at one of the tool holding grippers 41 of the front and rear racks 4 and a large-diameter tool 104 is held at the transfer gripper 93 of the tool transfer device 9, the large-diameter tool 104 held at either of the front and rear racks 4 do not interfere with the large-diameter tool 104 held at the transfer gripper 93 of the tool transfer device 9.

In the tool magazine apparatus 1 described above, a wide variety of tools A that had been stored at the tool storage part 5 are held at the tool holding grippers 41 at required positions of the front and rear racks 4, which is performed manually by an operator. At this time, because the tool phase determining keys 42 do not fit into tool phase determining keyways having the smaller depth and width of the tools conforming to the DIN standards, the CAT standards, and the HSK standards, the phase around the tool axis of the tools A relative to the tool holding gripper 41 is in a normal state.

Next, a method of tool change between the spindle 101 of the horizontal machining center 100 and the racks 4 of the magazine body 2 of the tool magazine apparatus 1 will be described.

During the machining by the spindle 101 to which a first tool A is attached, both of the tool grasping parts 62 of the tool change arm 61 of the automatic tool change device 6 are empty, and the tool change arm 61 is in a standby position in which the longitudinal direction is directed in the up-down direction. Also, during the machining by the spindle 101, a second tool A to be used for the next machining is held at the tool standby pot 7, and a third tool A to be used for the machining after the next is held at the tool transfer gripper 93 of the tool transfer device 9. In addition, both of the tool grasping parts 82 of the swivel arm 81 of the intra-magazine tool change device 8 are empty, and the swivel arm 81 is in a standby position in which the longitudinal direction is directed in the up-down direction.

When the machining by the first tool A attached to the spindle 101 is completed, the spindle 101 is caused to move to a tool change position, the tool change arm 61 of the automatic tool change device 6 is rotated from the standby position, and the first tool A is grasped by one of the tool grasping parts 62 while the second tool A being held at the tool standby pot 7 is grasped by the other of the tool grasping parts 62.

Next, the spindle 101 moves in the Z-axis direction relative to the tool change arm 61, and the tool change arm 61 moves in the Z-axis direction relative to the tool standby pot 7, whereby the first tool A is pulled out from the spindle 101 and the second tool A is pulled out from the tool standby pot 7.

Next, after the tool change arm 61 is rotated, the spindle 101 moves in the Z-axis direction relative to the tool change arm 61, and the tool change arm 61 moves in the Z-axis direction relative to the tool standby pot 7, whereby the first tool A is held at the tool standby pot 7 while the second tool A is attached to the spindle 101. Because the first tool A is inverted by the tool change arm 61, the first tool A held at the tool standby pot 7 is in a phase inverted 180 degrees around the tool axis from the phase of the first tool A having been attached to the spindle 101.

During machining by the spindle 101 using the second tool A, the swivel arm 81 of the intra-magazine tool change device 8 is rotated, and the first tool A held at the tool standby pot 7 is grasped by one of the tool grasping parts 82 while the third tool A held at the tool transfer gripper 93 is grasped by the other of the tool grasping parts 82 (see FIG. 4). Next, the swivel arm 81 moves in the Z-axis direction relatively to the tool standby pot 7 and the tool transfer device 9, whereby the first tool A is pulled out from the tool standby pot 7, and the third tool A is pulled out from the transfer gripper 93 of the tool transfer device 9.

Next, after the swivel arm 81 is rotated to a tool change position between the tool standby pot 7 and the transfer gripper 93, the swivel arm 81 moves in the Z-axis direction relative to the tool standby pot 7 and the tool transfer device 9, whereby the first tool A is held at the transfer gripper 93 of the tool transfer device 9 while the third tool A is held at the tool standby pot 7. Because the first tool A is inverted 180 degrees around the tool axis by the swivel arm 81, the first tool A held at the transfer gripper 93 is in an identical phase around the tool axis to the phase of the first tool A having been attached to the spindle 101.

When the first tool A is held at the transfer gripper 93 of the tool transfer device 9, the moving body 91 moves along the vertical guide rail 33 and the vertical guide rail 33 moves along the horizontal guide rails 34, whereby the tool transfer device 9 moves to a delivery position where the first tool A is delivered to one of the tool holding grippers 41 of either of the front and rear racks 4 to store the first tool A (see FIG. 5A). Next, the base 92 rotates around the swivel center, whereby the tool phase determining keyway having the greater depth and width on the first tool A is directed to a tool holding gripper 41 side of the rack 4 (see FIG. 5B). Next, the air cylinder 94 causes the transfer gripper 93 to be moved toward a deeper side of the tool holding gripper 41, and a V-flange part of the first tool A is held at the tool holding gripper 41 (see FIG. 5C). As a result, the first tool A is held at the tool holding gripper 41 in a normal state, and the first tool A is stored at the tool holding gripper 41 of the rack 4 of the magazine body 2. Thereafter, the air cylinder 94 causes the transfer gripper 93 to return to the original position and causes the base 92 to return to the original position.

Because the moving body 91 moves along the vertical guide rail 33 and the vertical guide rail 33 moves along the horizontal guide rails 34, the tool transfer device 9 that has stored the first tool A at the tool holding gripper 41 of the rack 4 of the magazine body 2 further moves to a delivery position for the tool holding gripper 41 of the rack 4 holding a fourth tool A to be used for the next machining, takes out the fourth tool A from the tool holding gripper 41 due to the rotation of the base 92 and the movement of the transfer gripper 93 by the air cylinder 94, and further moves to a tool delivery position with respect to the intra-magazine tool change device 8.

By repeating the operation as described above, the horizontal machining center 100 performs machining by the spindle 101 using the various tools A.

In the above-described embodiment, the both front and rear racks 4 are respectively arranged at intervals in the right-left direction, with the longitudinal direction thereof directed in the up-down direction, and the tools are held such that the direction of the tool axis is directed in the Z-axis direction (here, the right-left direction). However, the present invention is not limited to this. So, in a case where the Z-axis direction, which is the axial direction of the spindle, is directed in the up-down direction, the front and rear racks 4 may be arranged at intervals in the up-down direction with the longitudinal direction thereof directed in the front-rear direction, and the tools may be held such that the direction of the tool axis is directed in the Z-axis direction (up-down direction).

REFERENCE SIGNS LIST

1: tool magazine apparatus
2: magazine body
3: frame
4: rack
41: tool holding gripper
42: tool phase determining key
7: tool standby pot
8: intra-magazine tool change device
81: swivel arm
82: tool grasping part
9: tool transfer device
91: moving body
92: base
93: tool transfer gripper
94: air cylinder (actuator)
102: long tool
103: short tool
104: large-diameter tool
A: tool

The invention claimed is:

1. A tool magazine apparatus comprising: a magazine body consisting of a frame, and a plurality of front racks and rear racks that are detachably attached to the frame with a longitudinal direction of the both-front and rear racks directed in an identical direction and are configured to hold a plurality of tools such that a direction of a tool axis of each tool of the plurality of tools is directed in a Z-axis direction which is a spindle axis direction; and a tool transfer device that is disposed on the magazine body so as to move in the Z-axis direction and in the longitudinal direction of the front and rear racks and is configured to take out a tool of the plurality of tools from the front and rear racks and attach the tool to the both front and rear racks, each of the front racks being provided at intervals in the longitudinal direction thereof with a plurality of tool holding grippers that are open rearward and are configured to hold the plurality of tools, each of the rear racks being provided at intervals in the longitudinal direction thereof with a plurality of tool holding grippers that are open frontward and are configured to hold the plurality of tools, and the front and rear racks being respectively arranged at intervals in the Z-axis direction, wherein     the tool magazine apparatus further comprises: a tool standby pot configured to hold the tool so as to be attached to or removed from a spindle of a machine tool, with the direction of the tool axis directed in the Z-axis direction; and an intra-magazine tool change device that is disposed on the magazine body so as to move in the Z-axis direction relative to the tool standby pot and is configured to deliver the tool between the tool standby pot and the tool transfer device, and     the tool transfer device comprises: a moving body that is disposed between the front racks and the rear racks and is configured to move in the Z-axis direction and in the longitudinal direction of the front and rear racks; a base that is disposed on the moving body so as to be rotatable around an axis extending in the Z-axis direction; a transfer gripper that is attached to the base so as to be movable in a plane orthogonal to the Z-axis direction and is configured to hold the tool with the direction of the tool axis directed in the Z-axis direction; and an actuator that is attached to the base and is configured to cause the transfer gripper to move in the plane so as to cause the transfer gripper to move to a tool attachment/detachment position to/from one of the tool holding grippers.

2. The tool magazine apparatus according to claim 1, wherein, at a deepest part of each of the tool holding grippers of the front and rear racks, provided is a key configured to fit only into a tool phase determining keyway having a greater depth and a greater width, out of two tool phase determining keyways that are formed at a tool holder and have different depths and widths.

3. The tool magazine apparatus according to claim 1, wherein the intra-magazine tool change device comprises a swivel arm that is provided at both end portions in a longitudinal direction thereof with tool grasping parts and is rotatable around an axis passing through a center part in the longitudinal direction and extending in the Z-axis direction, the both tool grasping parts of the swivel arm have point symmetry having a rotation center thereof as a symmetry center thereof when viewed in the Z-axis direction, and the intra-magazine tool change device is configured to deliver the tool between the tool standby pot and the transfer gripper such that a state in which the tool is held at the tool standby pot and a state in which the tool is held at the transfer gripper of the tool transfer device are in opposite phases around the tool axis to each other.

4. The tool magazine apparatus according to claim 1, wherein, among all of the front and rear racks, there exist a plurality of types of racks configured to hold tools of the plurality of tools having different lengths and diameters.

* * * * *